US011813834B2

(12) United States Patent
Choi et al.

(10) Patent No.: US 11,813,834 B2
(45) Date of Patent: Nov. 14, 2023

(54) COMPOSITE MATERIAL STITCHING STRUCTURE REINFORCED WITH Z-DIRECTION FIBER

(71) Applicant: INDUSTRY-ACADEMIC COOPERATION FOUNDATION GYEONGSANG NATIONAL UNIVERSITY, Jinju-si (KR)

(72) Inventors: Jin Ho Choi, Jinju-si (KR); Jin Hwe Kweon, Jinju-si (KR)

(73) Assignee: INDUSTRY-ACADEMIC COOPERATION FOUNDATION GYEONGSANG NATIONAL UNIVERSITY

( * ) Notice: Subject to any disclaimer, the term of this patent is extended or adjusted under 35 U.S.C. 154(b) by 490 days.

(21) Appl. No.: 16/788,346

(22) Filed: Feb. 12, 2020

(65) Prior Publication Data
US 2020/0180261 A1    Jun. 11, 2020

Related U.S. Application Data

(63) Continuation of application No. 15/775,693, filed as application No. PCT/KR2016/013012 on Nov. 11, 2016, now abandoned.

(30) Foreign Application Priority Data

Nov. 13, 2015    (KR) .......................... 10-2015-0159321

(51) Int. Cl.
*B32B 5/06*          (2006.01)
*B32B 37/06*         (2006.01)
(Continued)

(52) U.S. Cl.
CPC .................. *B32B 5/06* (2013.01); *B32B 5/26* (2013.01); *B32B 7/12* (2013.01); *B32B 37/06* (2013.01);
(Continued)

(58) Field of Classification Search
CPC .... B32B 5/06; B32B 5/26; B32B 7/12; B32B 37/06; B32B 2038/0072; B32B 2038/008;
(Continued)

(56) References Cited

U.S. PATENT DOCUMENTS

| 6,291,049 B1 | 9/2001 | Kunkel et al. |
| 7,217,453 B2 | 5/2007 | Johnson et al. |

(Continued)

FOREIGN PATENT DOCUMENTS

| JP | 2005205902 | 8/2005 |
| JP | 2015112866 | 6/2015 |

(Continued)

OTHER PUBLICATIONS

International Search Report with English Translation of the International Searching Authority Corresponding to International Patent Application No. PCT/KR2016/013012 dated Feb. 15, 2017 (7 pages).

(Continued)

*Primary Examiner* — Christopher W Raimund
(74) *Attorney, Agent, or Firm* — Myers Bigel, P.A.

(57) ABSTRACT

The present invention relates to a fastening structure of a composite material structure, and more particularly, to a composite material stitching structure reinforced with z-direction fiber which improves strength in a lamination direction of a relatively weak composite material structure, for a composite material structure, in which composite materials are laminated and bonded.

2 Claims, 8 Drawing Sheets

(51) Int. Cl.
  *C08J 5/24*  (2006.01)
  *D06M 17/00*  (2006.01)
  *B32B 5/26*  (2006.01)
  *B32B 7/12*  (2006.01)
  *B32B 38/00*  (2006.01)
  *D06M 101/40*  (2006.01)

(52) U.S. Cl.
  CPC .............. *C08J 5/243* (2021.05); *D06M 17/00* (2013.01); *B32B 2038/008* (2013.01); *B32B 2038/0072* (2013.01); *B32B 2250/20* (2013.01); *B32B 2260/021* (2013.01); *B32B 2260/046* (2013.01); *B32B 2262/106* (2013.01); *B32B 2305/076* (2013.01); *D06M 2101/40* (2013.01)

(58) Field of Classification Search
  CPC .......... B32B 2250/20; B32B 2260/021; B32B 2260/046; B32B 2262/106; B32B 2305/076; B32B 3/02; B32B 5/10; B32B 2250/02; B32B 2260/023; C08J 5/24; D06M 17/00; D06M 2101/40
  See application file for complete search history.

(56) References Cited

U.S. PATENT DOCUMENTS

| | | | |
|---|---|---|---|
| 2001/0031350 A1* | 10/2001 | Day | B29C 70/24 428/105 |
| 2002/0153084 A1* | 10/2002 | Johnson | E01C 9/086 156/148 |
| 2004/0137231 A1* | 7/2004 | Johnson | B29C 70/088 428/411.1 |
| 2005/0025948 A1* | 2/2005 | Johnson | B32B 5/18 428/223 |
| 2011/0236620 A1 | 9/2011 | Duffy | |

FOREIGN PATENT DOCUMENTS

| | | |
|---|---|---|
| KR | 100630427 | 10/2006 |
| KR | 1020120067202 | 6/2012 |
| KR | 101318312 | 10/2013 |
| KR | 1020150077640 | 7/2015 |

OTHER PUBLICATIONS

An, Woo-Jin, et al., "Experimental failure strengths of composite single-lap joints reinforced with I-Fiber stitching process", Advanced Composite Materials, vol. 31, Issue 6, May 11, 2022, 15 pp.

An, Woo-Jin, et al., "Process variables of I-fiber stitching in Mode I failure", Composite Structures, vol. 240, May 15, 2020, 9 pp.

An, Woo-Jin, et al., "Static strength of RTM composite joint with I-fiber stitching process", Composite Structures, vol. 210, Feb. 15, 2019, pp. 348-353.

Kim, Cheol Hwan, et al., "Failure strength of composite T-joints prepared using a new 1-thread stitching process", Composite Structures, vol. 178, Oct. 15, 2017, pp. 225-231.

Kim, Cheol-Hwan, et al., "Impact characteristics of composite panel stitched by I-fiber process", Composites Part A: Applied Science and Manufacturing, vol. 127, Dec. 2019, 8 pp.

Tapullima, Jonathan, et al., "Analysis and experiment on DCB specimen using I-fiber stitching process", Composite Structures, vol. 220, Jul. 15, 2019, pp. 521-528.

Tapullima, Jonathan, et al., "Characterization of mode II specimen using I-fiber Stitching process", Composite Structures, vol. 255, Jan. 1, 2021, 10 pp.

Tapullima, Jonathan, et al., "FEM analysis of unit cell using single I-Fiber stitching process", Journal of Composite Materials, vol. 56, Issue 12, Mar. 30, 2022, 11 pp.

* cited by examiner

FIG. 1 *(PRIOR ART)*

COMPOSITE MATERIAL STITCHING STRUCTURE REINFORCED WITH Z-DIRECTION FIBER

CROSS-REFERENCE TO RELATED APPLICATIONS

This U.S. application is a continuation of U.S. patent application Ser. No. 15/775,693, filed May 11, 2018, which claims priority under 35 U.S.C. § 371 national phase application of International Application Serial No. PCT/KR2016/013012, filed on Nov. 11, 2016, the disclosures of which is incorporated herein in their entirety.

TECHNICAL FIELD

The present invention relates to a fastening structure of a composite material structure, and more particularly, to a composite material stitching structure reinforced with a z-direction fiber which improves strength in a lamination direction of a relatively weak composite material structure, for a composite material structure, in which composite materials are laminated and bonded.

BACKGROUND ART

The most general method of manufacturing a polymer composite material having high-performance is a molding method of cutting prepreg in a predetermined size, laminating the prepreg, and then vacuum-heating and curing the prepreg within an autoclave. However, in the simple laminated composite material, a delamination phenomenon, in which layers are easily separated, is easily generated by an impact load during usage.

The most effective method of suppressing the delamination is to use a three-dimensional fiber arrangement structure through fiber reinforcement in a thickness direction. The structure in the thickness direction may be generally obtained by three-dimensional weaving, and a representative technology includes braiding, weaving, Z-pinning, or stitching.

Since the three-dimensional braiding or weaving process has a limited size that can be made by the process and has very long manufacturing time, so that the process is not much used, except for a special product.

The Z-pinning technology is a method of inserting metal pins or cured composite pins into the plurality of composite material laminated structure and then molding the composite material laminated structure, and a property in a z-direction of the composite material may be slightly increased, but there is a disadvantage in that there needs lots of time and effort for inserting the metal pins or the cured composite material pins.

Further, the stitching technology is a method of binding the entire plurality of laminated sheets of fabric through stitching with a needle in a thickness direction, and has an advantage in that the stitching technology is not limited much by a size of a product and productivity is very high, but has a disadvantage in that fiber is damaged due to the penetration by the needle and resin impregnation is incomplete during the molding of the composite material.

FIG. 1 is a cross-sectional view illustrating a stitching method in the related art. The existing stitching method has a structure in which an upper thread (yellow) and a lower thread (green) are continuously twisted and connected as illustrated in FIG. 1, and thus each of the upper thread and the lower thread is bent at an angle of 180°, so that there is a disadvantage in that only soft fiber can be stitched. For a composite material, polymer-based fiber, such as aramid fiber, having excellent flexibility, is mainly used for stitching, and for high-stiffness and high-strength carbon fiber, stitched fiber is damaged during a stitching process or usage, so that it fails to sufficiently exert strength. Accordingly, in order to improve a property of a composite material in a z-direction, a method of stitching high-stiffness and high-strength carbon fiber is increasingly demanded.

Particularly, when prepreg is laminated and bonded, strength in a z-direction (lamination direction) is weak, so that there is a demand for development of a composite material structure adopting a stitching structure, which improves strength in a z-direction and makes a product be easily manufactured.

DETAILED DESCRIPTION OF THE INVENTION

Technical Problem

The present invention is conceived to solve the foregoing problems, and an object of the present invention is to provide a composite material stitching structure reinforced with z-direction fiber, in which high-strength monofilaments having a predetermined length is disposed while passing through a composite material laminated body, in which a plurality of composite materials is laminated, in a lamination direction of the composite material laminated body, a distal end of the fiber protrudes toward an external side of a composite material structure, and the protruding distal end is bent within 90° and is arranged in a plane direction of a composite material to bond the plurality of composite material laminated structure.

Another object of the present invention is to provide a composite material stitching structure reinforced with z-direction fiber, in which since uncured composite fiber penetrates a uncured composite laminated body, damage to the fiber is minimized, and the composite fiber is heat-cured through a heat curing process of the composite material laminated body and is firmly fixed to the composite material laminated body to support the composite material laminated body.

Technical Solution

A composite material stitching structure reinforced with z-direction fiber of the present invention includes: a composite material laminated body in which a plurality of uncured composite prepreg or preform is laminated; and uncured flexible composite fiber which penetrates the composite material laminated body in a lamination direction of the composite material laminated body and has a predetermined length, in which the composite fiber is penetrated so that a distal end of the composite fiber protrudes from the outermost portion of the composite material laminated body to an external side by a predetermined distance, the protruding distal end is bent and is disposed in a plane direction of the composite material laminated body, and the composite fiber is bent and fixed through a heat curing process of the composite material laminated body.

Further, the composite fiber is formed of discontinuous monofilaments.

Further, bending directions of a distal end at one side of the composite fiber and a distal end at the other side of the composite fiber are arranged in a specific direction on a surface of the composite material laminated body.

Further, the composite fiber is formed of a plurality of strands, and a plurality of strands of the distal end of the composite fiber is radially bent.

Further, the bending direction of the distal end at one side of the composite fiber is opposite to the bending direction of the distal end at the other side of the composite fiber.

Further, the composite fiber penetrates the composite material laminated body in the lamination direction of the composite material, and the plurality of composite fiber is disposed while being spaced apart from one another in a plane direction of the composite material.

Advantageous Effects

In the composite material stitching structure reinforced with z-direction fiber of the present invention by the foregoing configuration, the reinforcement fiber is not bent at 90° or more, so that there are effects in that it is possible to stitch high-stiffness and high strength fiber, such as carbon fiber, and minimize damage to the stitched fiber, and a z-directional (lamination direction) property of a composite material structure is remarkably improved by the fiber bent at 90° or less and arranged in a plane direction of the composite material.

Further, since uncured flexible composite fiber penetrates an uncured composite material laminated body, there is an advantage in that it is possible to prevent the fiber from being damaged and broken and firmly support the composite material laminated body through the foregoing composite fiber. Further, heat curing of the composite fiber is performed at the same time through a heat curing process of the composite material laminated body, so that there is no need for a separate process for fixing the composite fiber to the composite material laminated body, thereby achieving effects in that a manufacturing process is simple and costs are decreased.

EXPLANATION OF REFERENCE NUMERALS AND SYMBOLS

Figure 1:
FIG. 1 is a cross-sectional view illustrating a stitching structure in the related art.

100: Composite material laminated body
110: Composite material
111: Flat composite material
112: T-shaped composite material reinforced panel
120: composite fiber
120a: Strand
121: One-side distal end
122: The other-side distal end

BEST MODE

Figure 2:
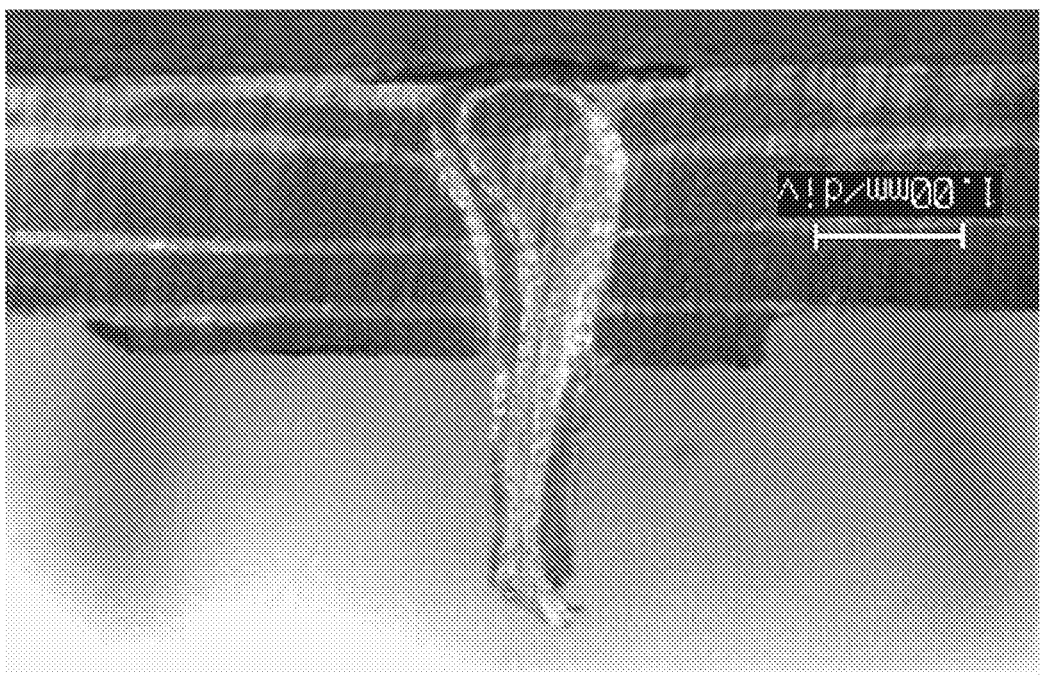
FIG. 2 is a picture of stitched fiber in which an angle of fiber bending is 180° or more.
Figure 3:
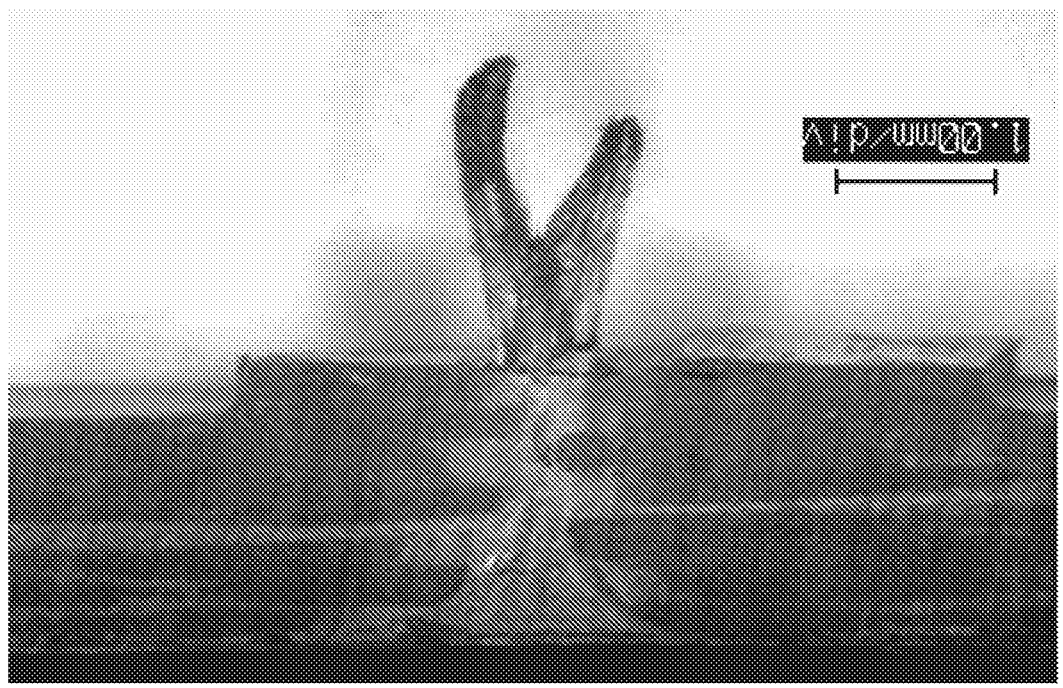
FIG. 3 is a picture of stitched fiber damaged due to a z-directional load.

FIG. 1 illustrates an existing stitching structure in which an upper thread (yellow) and a lower thread (green) are continuously twisted, so that an angle of fiber bending is 180° or more, FIG. 2 is a picture of stitched fiber in which an angle of fiber bending is 180° or more, and it can be seen that when a load is applied in a z-direction of a composite material, a portion bent at 180° is easily broken as illustrated in FIG. 3.

That is, since the existing stitching structure is a structure in which fiber bending of 180° or more is essentially generated, when a z-directional load is generated, the stitching structure is weak and it is highly possible that the fiber is damaged or broken, and there is a disadvantage in that it is impossible to apply high-strength fiber, such as carbon fiber, for reinforcing strength.

A composite material stitching structure reinforced with z-direction fiber of the present invention for solving the disadvantage will be described in detail with reference to the drawings.

Figure 4:
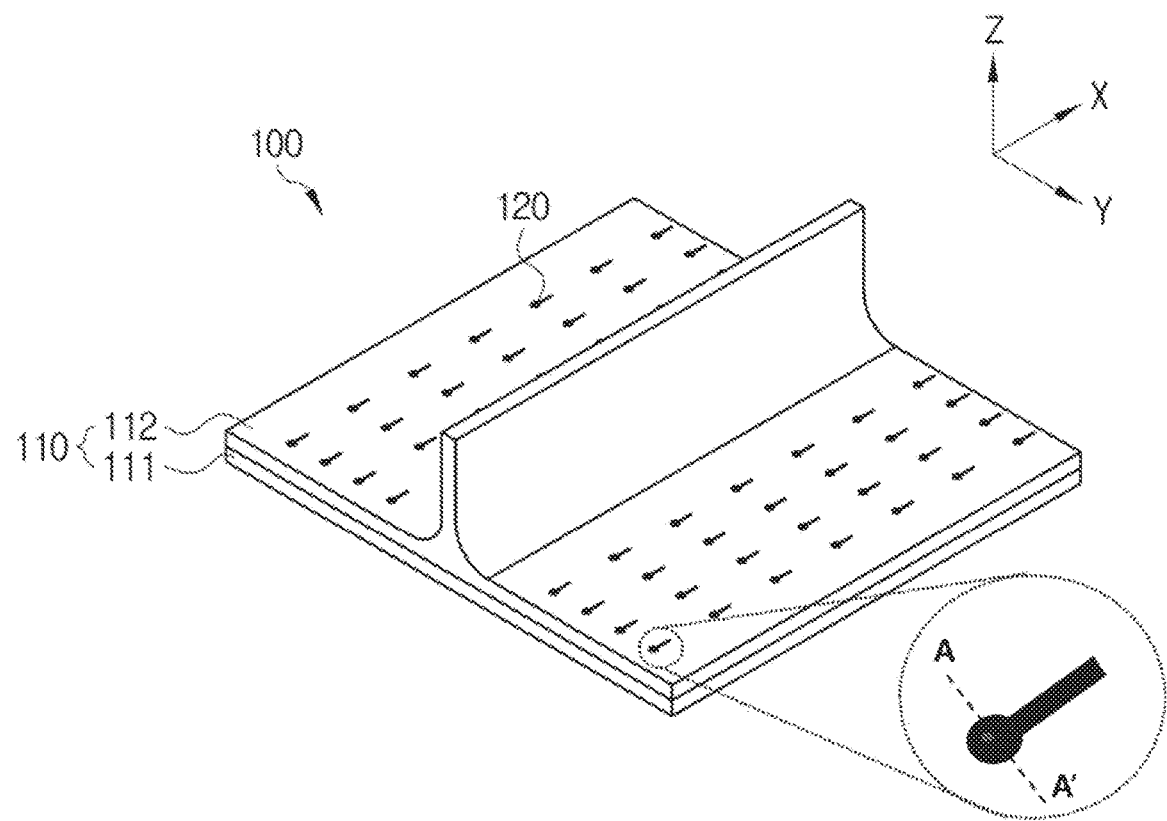
FIG. 4 is a perspective view illustrating a composite material stitching structure according to an exemplary embodiment of the present invention.
Figure 5:
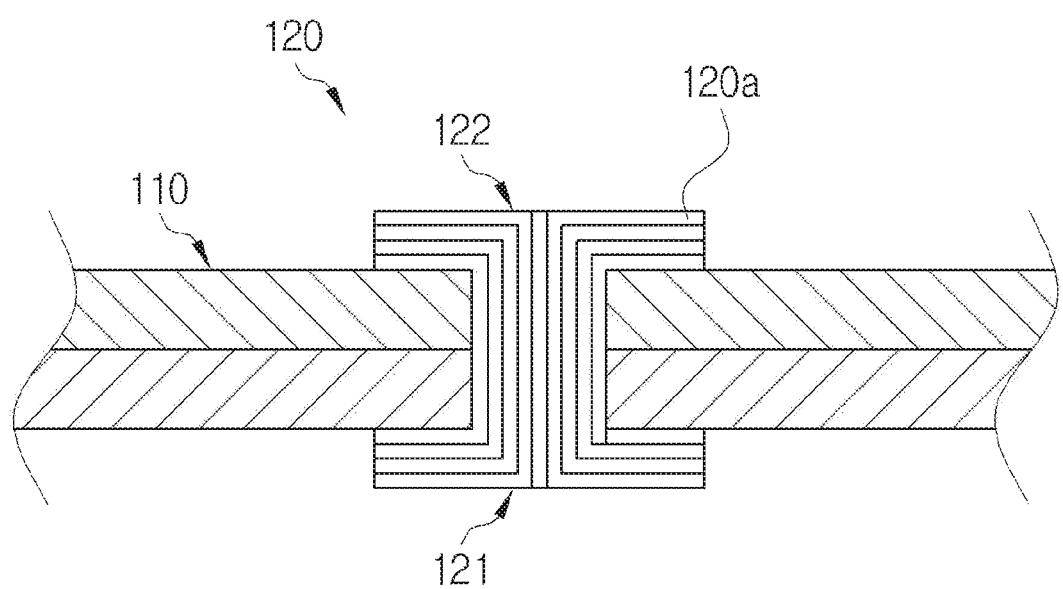
FIG. 5 is a cross-sectional view of FIG. 4 taken along line AA'.

FIG. 4 is a perspective view illustrating a composite material stitching structure according to an exemplary embodiment of the present invention, and FIG. 5 is a cross-sectional view of the composite material stitching structure 100 according to the exemplary embodiment of the present invention taken along line A-A'.

For convenience of the description, a direction orthogonal to a surface direction of a composite material is defined as a z-direction. Accordingly, a lamination direction of a composite material 110 is also defined as the z-direction for description.

As illustrated, the composite material stitching structure includes a composite material laminated body 100 in which the plurality of composite materials 110 is laminated in the z-direction. As the composite material 110, prepreg, preform, or the like is applicable. In this case, the composite material 110 may also be a flat composite material 111 and may be a T-shaped composite material reinforced panel 112 of which a cross-section has a "T" shape as illustrated. The composite material laminated body 100 may also be formed of a combination of the single flat composite material 111 and the single T-shaped composite material reinforced panel 112 as illustrated, and may also be formed of a combination of two or more flat composite materials 111 and the single T-shaped composite material reinforced panel 112. That is, the number of flat composite materials 111 may be adjusted according to strength demanded by the composite material laminated body 100.

In order to bond the plurality of composite materials 110, the present invention includes composite fiber 120 formed of a single material. In general, a diameter of one strand 120a of the composite fiber 120 is about several μm to several tens of μm, and the predetermined number or more of strands is provided in the form of one bundle to form fiber, and 1 K indicates one fiber bundle formed of 1,000 strands. In general, in order to stitch a composite material, composite fiber in the form of 1 K is often used.

However, the form of the composite fiber 120 is not limited to the form of 1 K, and composite fiber of 1 K or less or 1 K or more may also be applied according to a strength condition required for bonding the composite material 110.

The composite fiber 120 may be formed of a high-strength material for reinforcing strength in the z-direction of the composite material laminated body 100. For example, the composite fiber 120 may be carbon fiber. When lots of organic polymer fiber is plasticized at about 1,000 to 3,000° C., the carbon fiber is generated, and is currently produced from acryl (poly acrylonitrile (PAN)) fiber, pitch fiber, and liquid crystal pitch fiber. The carbon fiber is mainly formed of carbon atom hexagonal mesh planes, but there are carbon fiber, in which the planes of the mesh are arranged to be almost parallel to a fiber axis (high-orientation, anisotropy), and carbon fiber, in which the planes of the mesh are disorderly gathered (isotropy). The PAN-based carbon fiber and the liquid crystal pitch-based carbon fiber are models of the former and the pitch-based carbon fiber is a model of the latter. The carbon fiber has low specific gravity, is not invaded by alkali or acid, and has a high heat-resisting property at an inert atmosphere. Carbon fiber has an electrical conductive property and wear resistance. The high-orientation carbon fiber has high tensile strength and high modulus of elasticity to be treated as high-performance (high grade) carbon fiber, and has a low coefficient of linear expansion. Further, the carbon fiber is surface-treated in order to improve adhesiveness for a resin. Active carbon fiber fabricated from rayon, PAN, and phenol fiber exhibits adsorption performance at the same level as that of granular activated carbon and a much higher adsorption-desorption speed than that of granular activated carbon. In addition, there is carbon fiber, which is capable of heating benzene and the like at around 1,000° C. and growing the benzene and the like up to 10 cm. Carbon fiber has high specific strength and specific modulus of elasticity, and particularly has specific modulus of elasticity, and the carbon fiber is used as a material, which is light and is not easily deformed when is cured by a resin.

The composite fiber 120 formed of the carbon fiber is formed by penetrating the composite material laminated body 100 in the lamination direction of the composite material laminated body 100. The composite fiber 120 is in the form of one bundle formed of a single material and is disposed while being spaced apart from one another in a plane direction of the composite material 111. In this case, the composite fiber 120 may be formed by penetrating the composite material laminated body 100 so that distal ends 121 and 122 of the composite fiber 120 protrude from the outermost portion of the composite material laminated body 100 toward the external side. The protruding distal ends 121 and 122 are bent at 90° or less with respect to the penetration direction, and more preferably, are vertically bent, to firmly bond the composite material laminated body 100.

Figure 6:
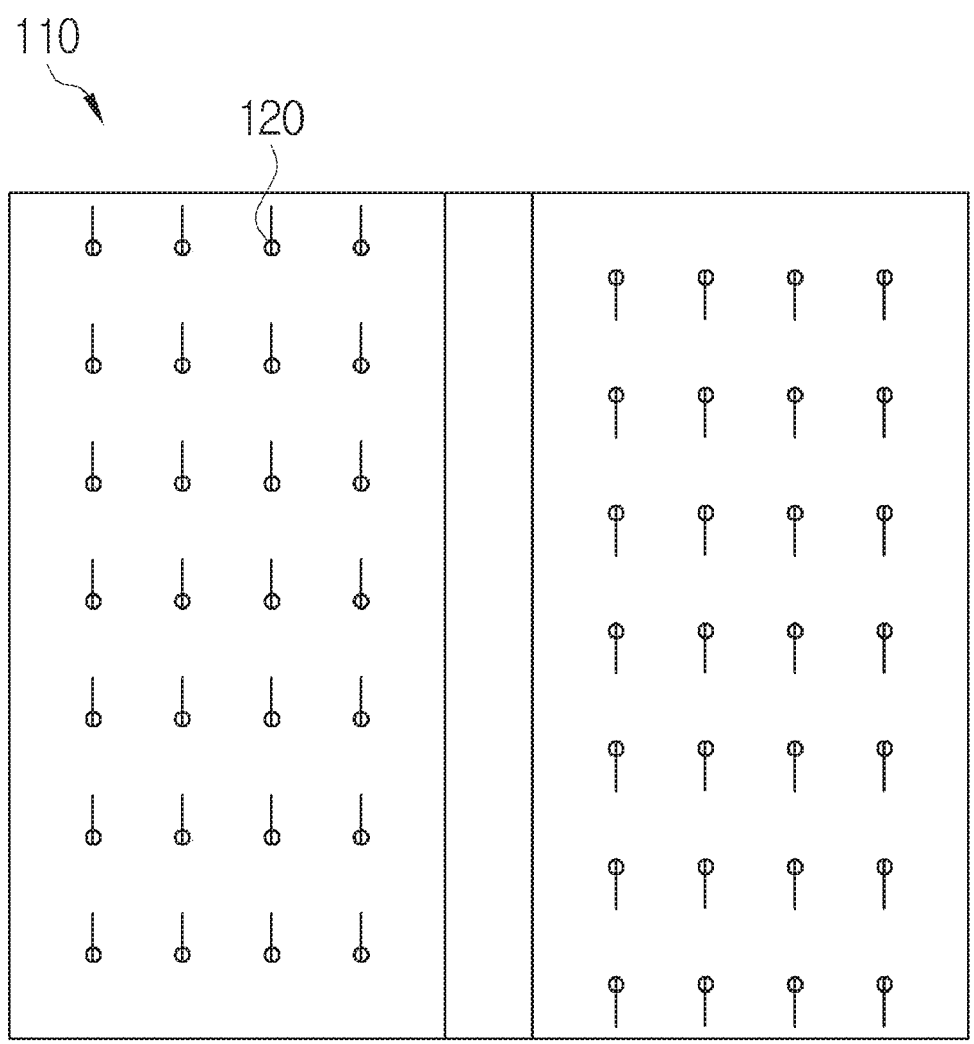
FIG. 6 is a top plan view illustrating the composite material stitching structure according to an exemplary embodiment of the present invention.
Figure 7:
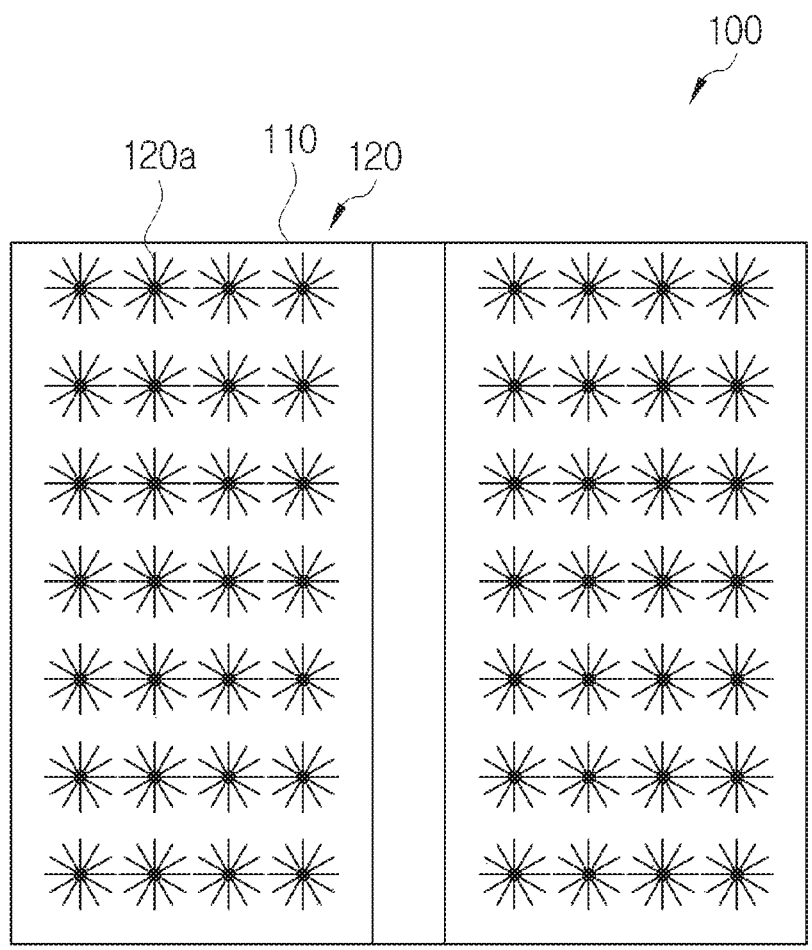
FIG. 7 is a top plan view illustrating a composite material stitching structure according to another exemplary embodiment of the present invention.

FIG. 6 is a top plan view illustrating the composite material laminated body 100 according to the exemplary embodiment of the present invention, and FIG. 7 is a top plan view illustrating a composite material laminated body 100 according to another exemplary embodiment of the present invention.

As illustrated, for the bent direction of the distal end of the composite fiber 120, the plurality of fiber strands is bent in a uniform direction as illustrated in FIG. 6. Further, the bent direction of the distal end 121 at one side of the composite fiber 120 may be opposite to the bent direction of the distal end 122 at the other side.

As another exemplary embodiment, composite fiber 120 is formed by one thousand or more fiber strands, and the plurality of fiber strands may be radially bent as illustrated in FIG. 7. When distal ends 121 and 122 of the composite fiber 120 are radially bent and fixed, z-directional strength of the composite material laminated body 100 may be further improved than that of the composite material laminated body 100 illustrated in FIG. 6.

Hereinafter, a manufacturing method of the present invention formed as described above will be described with reference to the drawing.

Figure 8A:
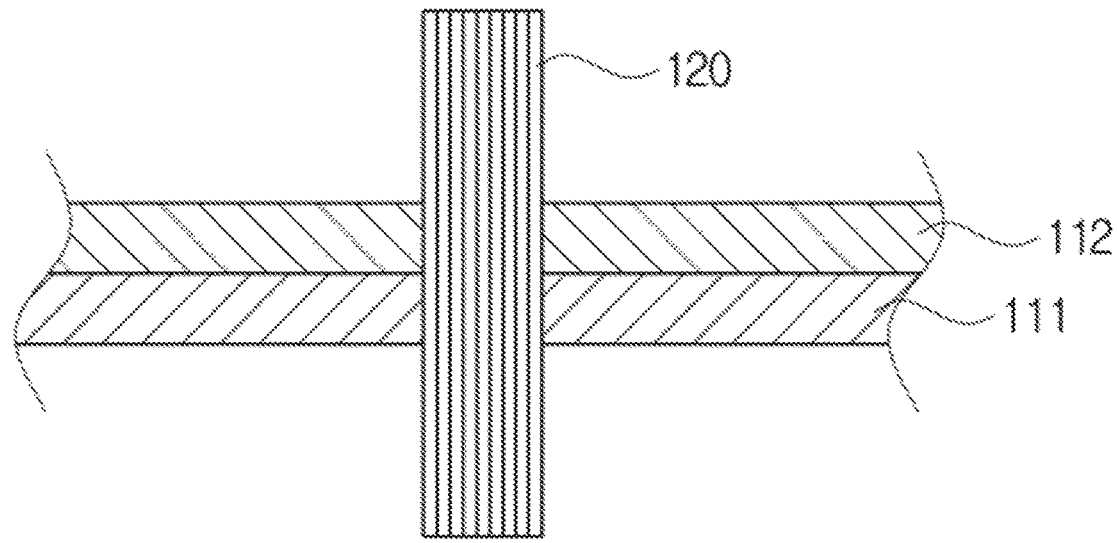
FIG. 8A illustrates that a composite fiber penetrates a composite material laminated body.
Figure 8B:
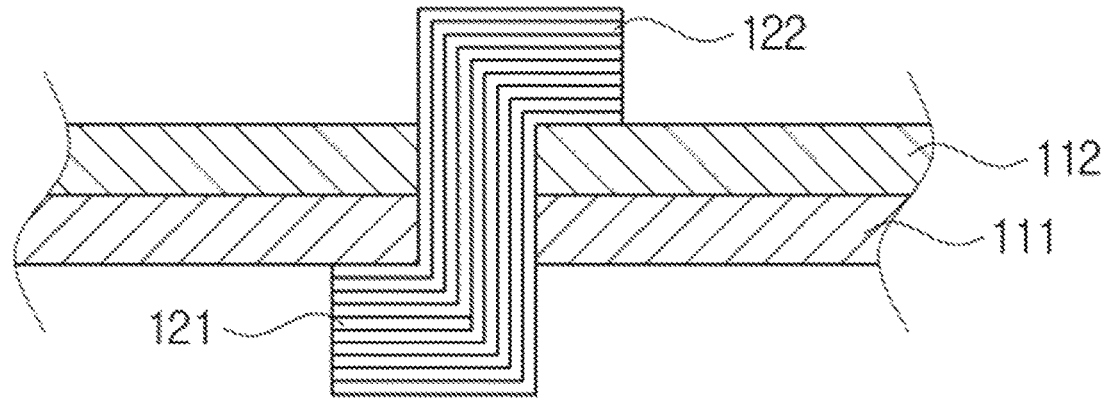
FIG. 8B illustrates that distal ends of a composite fiber are bent and fixed in a plane direction of a composite material laminated body.

Referring to FIGS. 8A and 8B, first, the single material composite fiber 120 penetrates the composite material laminated body 100. In this case, the composite material laminated body 100 is in an uncured state, and the composite fiber 120 also penetrates the composite material laminated body 100 in a state of maintaining a flexible state before heat curing.

A needle structure, in which the composite fiber 120 is continuously supplied, may be applied for the penetration of the composite fiber 120, and the composite fiber 120 may first penetrate the composite material laminated body 100 through the needle and then the composite fiber 120 supplied from the needle may be accommodated on the penetrated composite material laminated body 100.

In this case, it is important to dispose the distal end 121 at one side of the composite fiber 120 and the distal end 122 at the other side to protrude from the outermost portion of the composite material laminated body 100 toward the external side. That is, the distal end 121 at one side of the composite fiber 120 protrudes from the lowermost portion of the composite fiber 120 downwards and the distal end 122 at the other side of the composite fiber 120 protrudes from the uppermost portion of the composite fiber 120 upwards.

Next, the distal end 121 at one side of the composite fiber 120 is bent and fixed by pressing one surface of the composite material laminated body 100 in the other direction, and the distal end 122 at the other side of the composite fiber 120 is bent and fixed by pressing the other surface of the composite material laminated body 100 in one direction. The foregoing operation is performed when the composite fiber 120 is in the flexible state, so that there is an advantage in that the composite fiber 120 is easily bent even with low force. The bending and fixing operation is an operation of heat curing the composite fiber 120 and is performed during the operation of heat curing the composite material laminated body 100 at the same time, and the composite fiber 120 is cut at a predetermined length interval and the composite material stitching structure is discontinuously reinforced with the composite fiber 120.

It shall not be construed that the technical spirit is limited to the exemplary embodiment of the present invention. Application ranges of the present invention are various as a matter of course, and the present invention may be variously modified and carried out at the levels of those skilled in the art without departing from the substance of the present invention claimed in the claims. Accordingly, the improvement and the change of the present invention belong to the scope of the present invention as long as being obvious to those skilled in the art.

What is claimed is:

1. A method for manufacturing a composite material stitching structure reinforced with z-direction fiber, the method comprising:
   penetrating through a composite material laminated body with a needle and accommodating a plurality of composite fibers continuously supplied from the needle on the composite material laminated body;
   passing the plurality of composite fibers through the composite material laminated body in which a plurality of uncured composite prepregs or preforms are laminated in a lamination direction of the composite material laminated body such that distal ends of the plurality of composite fibers protrude from an outermost portion of the composite material laminated body to an external side by a predetermined distance; and bending and fixing the distal ends of the plurality of composite fibers in a plane direction of the composite material laminated body, wherein said bending and fixing the distal ends comprises bending first ends of the distal ends of the plurality of composite fibers radially to extend in an omnidirectional manner on a first surface of the composite material laminated body and bending second ends of the distal ends of the plurality of composite fibers radially to extend in an omnidirectional manner on a second surface of the composite material laminated body, wherein the plurality of composite fibers are flexible before the heat curing process, and wherein each of the plurality of composite fibers comprises a plurality of strands provided in the form of a single bundle of carbon fiber of 1,000 or more strands.

2. The method of claim 1, wherein said passing the plurality of composite fibers comprises arranging the plurality of composite fibers to be spaced apart from each other on the first and second surfaces of the composite material laminated body.

* * * * *